(12) United States Patent
Takeno et al.

(10) Patent No.: US 11,220,073 B2
(45) Date of Patent: Jan. 11, 2022

(54) METHOD FOR MANUFACTURING COMPOSITE MATERIAL

(71) Applicant: MITSUBISHI HEAVY INDUSTRIES, LTD., Tokyo (JP)

(72) Inventors: Kazuma Takeno, Tokyo (JP); Mitsutoshi Maeda, Tokyo (JP); Hiroshi Tokutomi, Tokyo (JP); Tetsuya Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 268 days.

(21) Appl. No.: 16/085,065

(22) PCT Filed: Apr. 5, 2017

(86) PCT No.: PCT/JP2017/014293
§ 371 (c)(1),
(2) Date: Sep. 14, 2018

(87) PCT Pub. No.: WO2017/175809
PCT Pub. Date: Oct. 12, 2017

(65) Prior Publication Data
US 2019/0077097 A1    Mar. 14, 2019

(30) Foreign Application Priority Data
Apr. 7, 2016    (JP) .............................. JP2016-077126

(51) Int. Cl.
*B29C 70/54*    (2006.01)
*B29C 70/44*    (2006.01)
*B29L 31/30*    (2006.01)

(52) U.S. Cl.
CPC .......... *B29C 70/548* (2013.01); *B29C 70/443* (2013.01); *B29K 2913/00* (2013.01);
(Continued)

(58) Field of Classification Search
None
See application file for complete search history.

(56) References Cited

U.S. PATENT DOCUMENTS

| | | | | |
|---|---|---|---|---|
| 4,902,215 A | * | 2/1990 | Seemann, III | .......... B29C 43/56 |
| | | | | 425/406 |
| 5,981,023 A | * | 11/1999 | Tozuka | ................... B29C 70/48 |
| | | | | 428/105 |

(Continued)

FOREIGN PATENT DOCUMENTS

| | | |
|---|---|---|
| CA | 2897381 A1 | 5/2013 |
| EP | 0749825 A2 | 12/1996 |
| JP | 5138553 B2 | 2/2013 |

OTHER PUBLICATIONS

Office Action for Canadian Application No. 3017455 dated Jul. 10, 2019; 5pp.

(Continued)

*Primary Examiner* — Matthew J Daniels
*Assistant Examiner* — Paul Spiel
(74) *Attorney, Agent, or Firm* — Kanesaka Berner and Partners LLP

(57) ABSTRACT

A method for manufacturing a composite material includes placing a netlike sheet material, through which a resin composition permeates, on reinforcing fiber substrates disposed on a forming die. The method includes covering the reinforcing fiber substrates disposed on the forming die and the bag surface-smoothing sheet with a bag film to form a sealed forming space between the bag film and the forming die. The method includes infusing a resin composition into the forming space to impregnate the reinforcing fiber substrates. The method includes curing the resin composition impregnated in the reinforcing fiber substrates. Warp yarns and weft yarns are disposed in a lattice pattern and, after placing the bag surface-smoothing sheet on the reinforcing (Continued)

fiber substrates so that the warp yarns and the weft yarns form acute angles with respect to corners of the reinforcing fiber substrates, the bag surface-smoothing sheet projecting from the reinforcing fiber substrates is bent.

12 Claims, 7 Drawing Sheets

(52) U.S. Cl.
CPC ............. *B29K 2995/0073* (2013.01); *B29L 2031/3076* (2013.01)

(56) References Cited

U.S. PATENT DOCUMENTS

| | | | |
|---|---|---|---|
| 2013/0192434 A1* | 8/2013 | Hashimoto | D04H 1/4274 83/13 |
| 2014/0147688 A1* | 5/2014 | Corral | B29C 70/546 428/519 |
| 2014/0327187 A1* | 11/2014 | Hurdle | B29C 70/443 264/443 |

OTHER PUBLICATIONS

International Search report for International Application No. PCT/JP20017/014293 dated Jun. 20, 2017; 2 pp.

* cited by examiner

METHOD FOR MANUFACTURING COMPOSITE MATERIAL

RELATED APPLICATIONS

The present application is a National Phase of International Application Number PCT/JP2017/014293 filed Apr. 5, 2017, and claims priority from Japanese Application Number 2016-077126 filed Apr. 7, 2016.

TECHNICAL FIELD

The present invention relates to a method for manufacturing a composite material and in particular to a method for manufacturing a large-sized composite material such as an aircraft part.

BACKGROUND ART

Fiber reinforced plastics (FRP) are lightweight and have excellent mechanical strength, and therefore the fiber reinforced plastics are used for structural members of aircraft, wind turbine blades, automobiles, ships, railroad vehicles, and the like.

As one method of forming fiber reinforced plastics, for example, a vacuum assisted resin transfer molding (VaRTM) method disclosed in PTL 1 is known.

In the VaRTM method, a plurality of reinforcing fiber substrates are laminated and disposed on a forming die, the reinforcing fiber substrates are covered with a pass medium that is a netlike sheet for resin diffusion in order to enhance resin impregnation efficiency, and the reinforcing fiber substrates and the pass medium are covered with a bag film that is a covering material. Then, a pressure in an interior of the bag film is reduced to a predetermined degree of vacuum, whereby a resin composition is injected into the bag film to be impregnated in the reinforcing fiber substrates, and then the impregnated resin is cured.

This VaRTM method is widely used as a method for manufacturing a large-sized composite material such as an aircraft part, because large-scaled equipment such as an autoclave which is used in an autoclave forming method is unnecessary.

The VaRTM method is being improved day by day, and, for example, in PTL 1, there has been proposed a method for manufacturing a composite material product using the VaRTM method, that is, a method for manufacturing a composite material in which it is possible to improve work efficiency and quality by using a silicone bag in which reinforcing fibers are disposed in an interior of a bag film enclosing a reinforcing fiber substrate.

CITATION LIST

Patent Literature

[PTL 1] Japanese Patent No. 5138553

SUMMARY OF INVENTION

Technical Problem

Incidentally, composite materials for aircraft are required to have good, that is, smooth surface texture.

However, the reinforcing fiber substrate is made of a woven fabric formed of reinforcing fibers, and valleys and mountains are present in a portion where the fibers are present and a portion where the fibers are not present. Therefore, if in a resin impregnation step, the impregnated resin composition is cured as it is, the valley portions and the mountain portions remain as irregularities. The irregularities occur on a surface side facing the bag film. However, the irregularities can be eliminated by covering the surface side facing the bag film, of the reinforcing fiber substrate, with a sheet material such as a film or a net having appropriate rigidity, and filling a gap between the sheet material and the reinforcing fiber substrate with a resin composition.

On the other hand, in order to cover the reinforcing fiber substrate with the sheet material, it is necessary to bend the sheet material at corners forming peripheral edges of the laminated reinforcing fiber substrate. However, if a sheet material having high rigidity is used, it becomes difficult to bend the sheet material along the corners. In this manner, if a sheet material with poor shape conformability is forcibly bent by applying a load to a part of the sheet material, a position where a contact of the sheet material is strong and a position where a contact is weak locally occur in a bent area, and variation in content rate of reinforcing fibers subjected to FRP forming occurs in the corners of a formed product and a vicinity of the corners.

From the above, the present invention has an object to provide a method for manufacturing a composite material, in which even if a sheet material having high rigidity is used, bending of the sheet material at corners is easy.

Solution to Problem

According to the present invention, there is provided a method for manufacturing a composite material including: a placement step of placing a netlike sheet, through which a resin composition permeates, on a reinforcing fiber substrate disposed on a forming die; a covering step of covering the reinforcing fiber substrate and the netlike sheet disposed on the forming die with a bag film to form a sealed forming space between the bag film and the forming die; an injection/impregnation step of injecting the resin composition into the forming space to impregnate the reinforcing fiber substrate with the resin composition; and a resin curing step of curing the resin composition impregnated in the reinforcing fiber substrate, in which in the netlike sheet, a plurality of warp yarns and a plurality of weft yarns are disposed in a lattice pattern, and in the placement step, after the netlike sheet is placed on the reinforcing fiber substrate such that the warp yarns and the weft yarns form acute angles with respect to corners of the reinforcing fiber substrate, the netlike sheet protruding from the reinforcing fiber substrate is bent.

In the method for manufacturing a composite material according to the present invention, it is preferable that the acute angle between each of the warp yarns and the weft yarn of the netlike sheet and each of the corners of the reinforcing fiber substrate is in a range of 40 degrees to 50 degrees.

In the method for manufacturing a composite material according to the present invention, it is preferable that the netlike sheet has a quadrangle when viewed in a plan view, the warp yarns and the weft yarns form acute angles with respect to peripheral edges defining the quadrangle, and in the placement step, after the netlike sheet is placed on the reinforcing fiber substrate such that the peripheral edges of the netlike sheet and the corners of the reinforcing fiber substrate are parallel to each other, the netlike sheet protruding from the reinforcing fiber substrate is bent.

In the method for manufacturing a composite material according to the present invention, it is preferable that the netlike sheet has a quadrangle when viewed in a plan view, the warp yarns and the weft yarns are orthogonal to peripheral edges defining the quadrangle, and in the placement step, after the netlike sheet is placed on the reinforcing fiber substrate such that the peripheral edges of the netlike sheet form acute angles with respect to the corners of the reinforcing fiber substrate, the netlike sheet protruding from the reinforcing fiber substrate is bent.

In the method for manufacturing a composite material according to the present invention, it is preferable that the method for manufacturing a composite material further includes a vacuum suction step of evacuating the forming space after the covering step and the injection/impregnation step is performed in the evacuated forming space.

Advantageous Effects of Invention

According to the method for manufacturing a composite material according to the present invention, even if a netlike sheet having high rigidity is used, bending of the netlike sheet at corners is easy.

BRIEF DESCRIPTION OF DRAWINGS

FIGS. 7A and 7B show the contact strength when the bag surface-smoothing sheet is bent at corners of the reinforcing fiber substrate, in which FIG. 7A is a diagram showing the present embodiment and FIG. 7B is a diagram showing a comparative example.

DESCRIPTION OF EMBODIMENTS

Hereinafter, an embodiment of the present invention will be described with reference to the accompanying drawings.

Figure 1A:
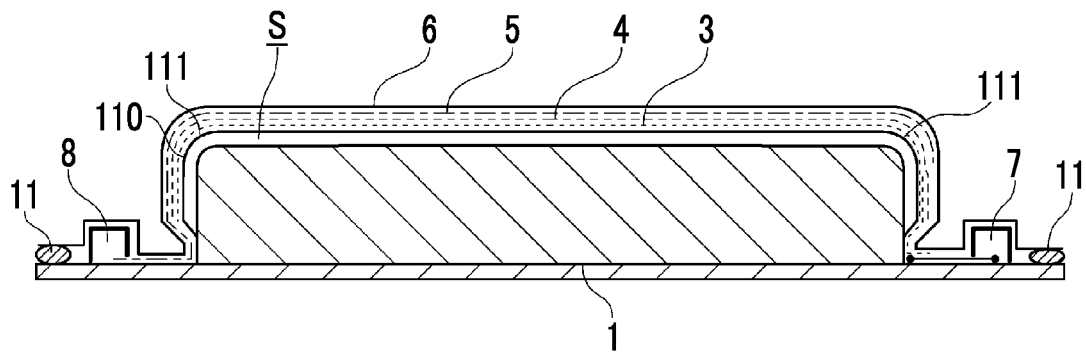
FIG. 1A is a cross-sectional view showing a process up to a covering step in a forming method of the present embodiment to which a VaRTM method is applied.
Figure 1B:
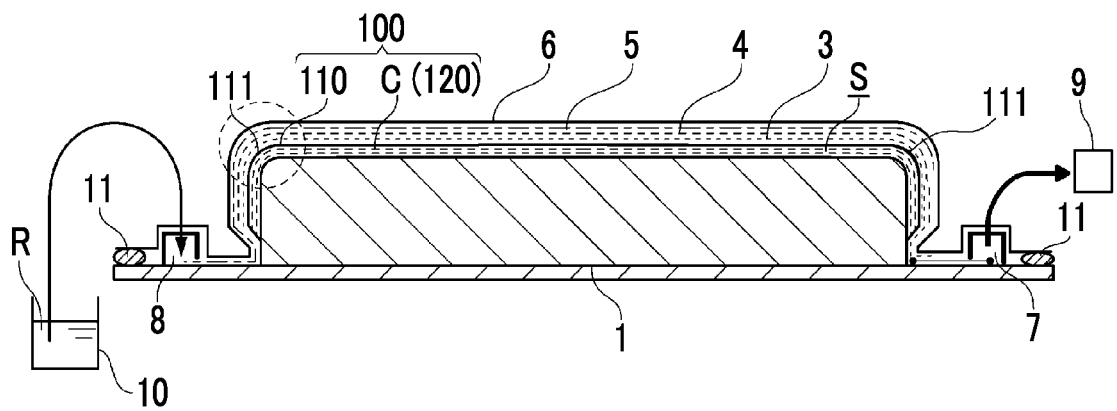
FIG. 1B is a cross-sectional view showing a process up to a resin curing step.
Figure 1C:
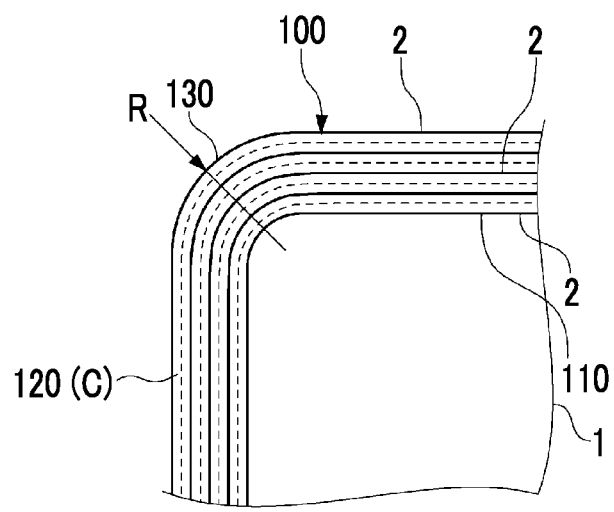
FIG. 1C is a partial cross-sectional view showing a formed composite material.

This embodiment relates to a method for manufacturing a composite material 100 having a laminated body 110 composed of a plurality of reinforcing fiber substrates 2, and a matrix resin 120 obtained by curing a resin composition C impregnated in the laminated body 110, as shown in FIG. 1C.

Further, this embodiment relates to an example in which a VaRTM method is applied to the present invention. Further, in this specification and claims, the expression "resin composition" is used to specify a state where it has not yet been cured, and is distinguished from "resin" in a case where it is already cured.

Hereinafter, a method for manufacturing the composite material 100 will be described.

[Placement Step]

Figure 2:
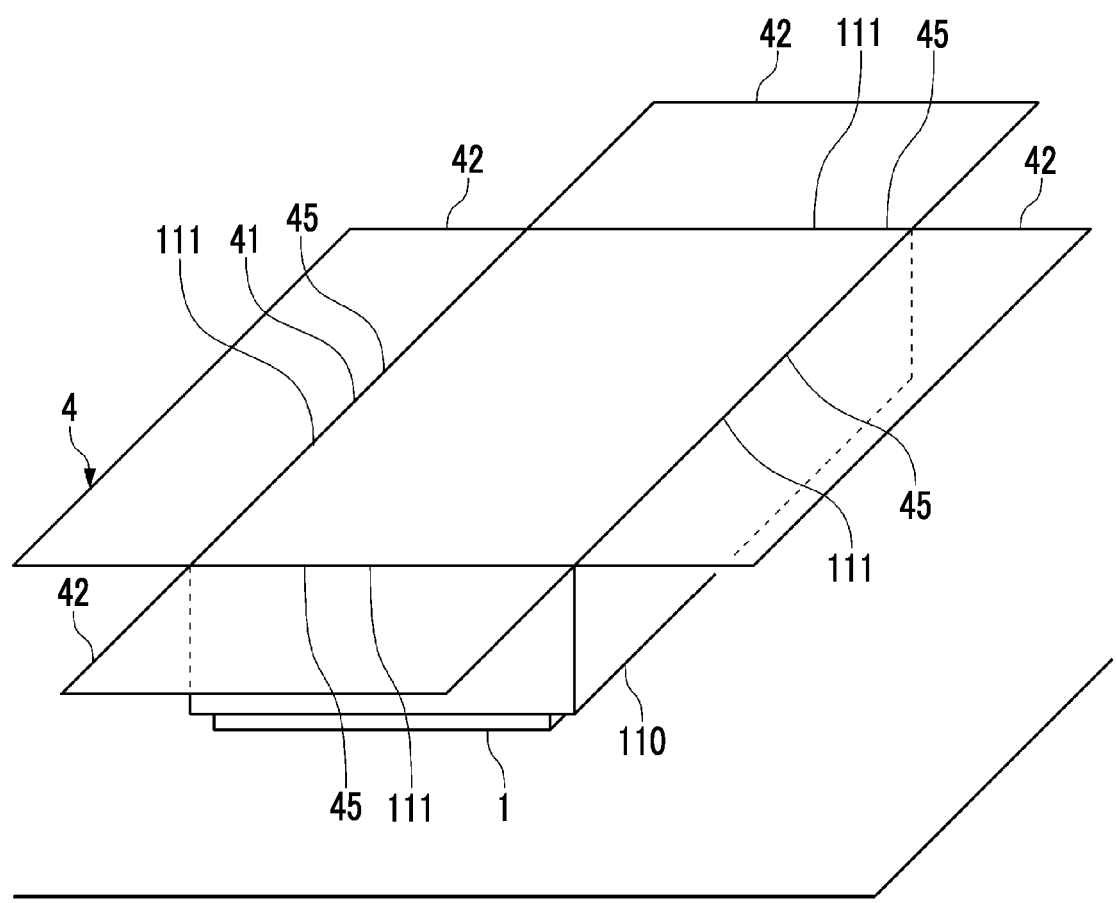
FIG. 2 is a perspective view showing a state where a bag surface-smoothing sheet is placed on a reinforcing fiber substrate.

First, as shown in FIG. 2, a predetermined number of rectangular sheet-like reinforcing fiber substrates 2 are stacked on a forming die 1. The laminated body 110 having the laminated reinforcing fiber substrates 2 has a rectangular parallelepiped appearance. The upper surface and the four side surfaces of the laminated body 110 are connected to each other through corners 111, respectively. Then, as shown in FIG. 1A, a peel ply 3 (a release sheet) is placed on the laminated body 110, and a bag surface-smoothing sheet 4 is placed on the peel ply 3. Further, pass medium 5 is disposed on the bag surface-smoothing sheet 4.

Both the bag surface-smoothing sheet 4 and the pass medium 5 are netlike sheet materials through which the resin composition C penetrates. However, the main purpose of the bag surface-smoothing sheet 4 is to smooth the surface facing a bag film 6, of the composite material 100, whereas the main purpose of the pass medium 5 is to uniformly and quickly infiltrate the resin composition C into the laminated body 110.

The forming die 1 is made of an iron-based metal material, for example, structural steel such as JIS SS400, stainless steel such as JIS SUS304, or an Invar alloy having a typical composition of 36 mass % Ni—Fe. However, the material configuring the forming die 1 is arbitrary as long as it exerts the function thereof, and gypsum, fiber reinforced plastic, or the like can be used. In this embodiment, the forming die 1 has a rectangular parallelepiped shape with a flat surface on which the reinforcing fiber substrate 2 is placed. However, the shape thereof is specified according to the shape of the composite material 100 to be manufactured.

The reinforcing fiber substrate 2 is composed of any known fibers such as carbon fibers, aramid fibers, or glass fibers, for example.

The peel ply 3 is provided in order to peel the bag surface-smoothing sheet 4 and the pass medium 5 and the bag film 6 above the bag surface-smoothing sheet 4 from the formed composite material 100 shown in FIG. 1C.

The peel ply 3 is configured with a woven fabric composed of chemical fibers, through which the resin composition C which is injected into a forming space S (described later) can penetrate, and which has releasability.

The bag surface-smoothing sheet 4 has moderate rigidity on the premise that the resin composition C injected from an injection port 8 permeates therethrough, and has smoothness for smoothing the surface facing the bag film 6, of the composite material 100.

Figure 3A:
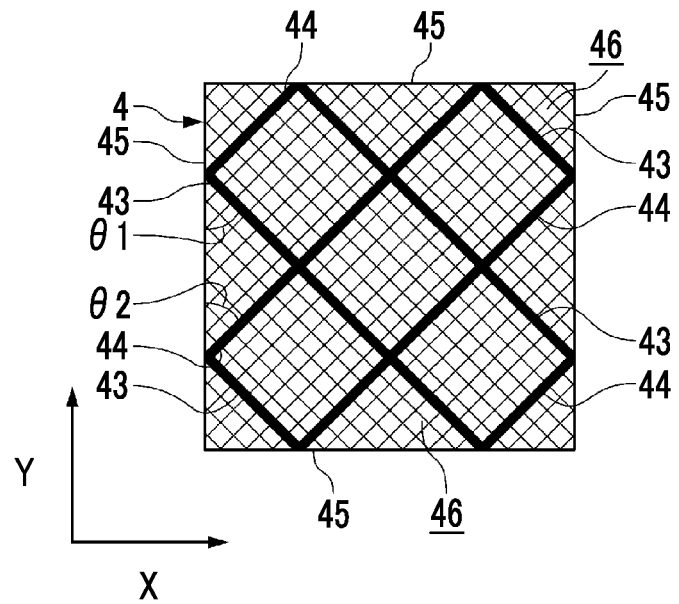
FIG. 3A is a plan view showing a bag surface-smoothing sheet in which warp yarns and weft yarns form acute angles with respect to sides.

The bag surface-smoothing sheet 4 is made of a netlike sheet in which a plurality of meshes 46 penetrating the front and back surfaces are formed, as shown in FIG. 3A. The injected resin composition C is impregnated in the reinforcing fiber substrate 2 through the meshes 46 of the bag surface-smoothing sheet 4 (refer to FIG. 1B).

In the bag surface-smoothing sheet 4, in order to have smoothness, the opening size (mesh) of the mesh 46 is set to be smaller than in the pass medium 5.

The bag surface-smoothing sheet 4 has a quadrangle when viewed in a plan view, as shown in FIG. 3A. However, in this embodiment, in consideration of placing the bag surface-smoothing sheet 4 on the laminated body 110 having a rectangular parallelepiped shape, as shown in FIG. 2, the bag surface-smoothing sheet 4 has a main body 41 which is placed on the upper surface of the laminated body 110, and four bent portions 42 respectively protruding from four peripheral edges 45 defining the main body 41. In FIG. 2, in order to facilitate understanding, illustration of the peel ply 3 is omitted.

After the bag surface-smoothing sheet 4 is placed on the laminated body 110, the respective bent portions 42 corresponding to the corners 111 of the laminated body 110 are bent downward from boundary portions (the peripheral edges 45) between the bent portions 42 and the main body 41, whereby the bent portions 42 are brought into contact with the side surfaces of the laminated body 110.

Further, warp yarns 43 and weft yarns 44 are provided in a lattice pattern on the surface of the bag surface-smoothing sheet 4, as shown in FIG. 3A. The warp yarns 43 and the weft yarns 44 are means for imparting rigidity to the bag surface-smoothing sheet 4. The warp yarns 43 and the weft yarns 44 are strength imparting materials added to the bag surface-smoothing sheet 4.

The warp yarns 43 are aligned parallel to each other and the weft yarns 44 are aligned parallel to each other, as shown in FIG. 3A. The warp yarns 43 and the weft yarns 44 intersect each other, and here, an example is shown in which the warp yarns 43 and the weft yarns 44 are disposed orthogonally to each other and in a lattice pattern.

Then, if each of the warp yarns 43 is disposed such that an angle θ1 between the warp yarn 43 and the peripheral edge 45 of the bag surface-smoothing sheet 4 forms an acute angle, each of the weft yarns 44 is also disposed such that an angle θ2 between the weft yarn 44 and the peripheral edge 45 forms an acute angle, similar to the warp yarn 43. In this embodiment, an example is shown in which the angle θ1 and the angle θ2 coincide with each other at 45 degrees.

In this manner, in a case where one of the angle θ1 and the angle θ2 is an acute angle, the other is also an acute angle. In this specification and claims, the acute angle means that both the angle θ1 and the angle θ2 are acute angles. The same applies to a case where in this specification, either one of the angle θ1 and the angle θ2 is pointed to be an acute angle.

Figure 5:
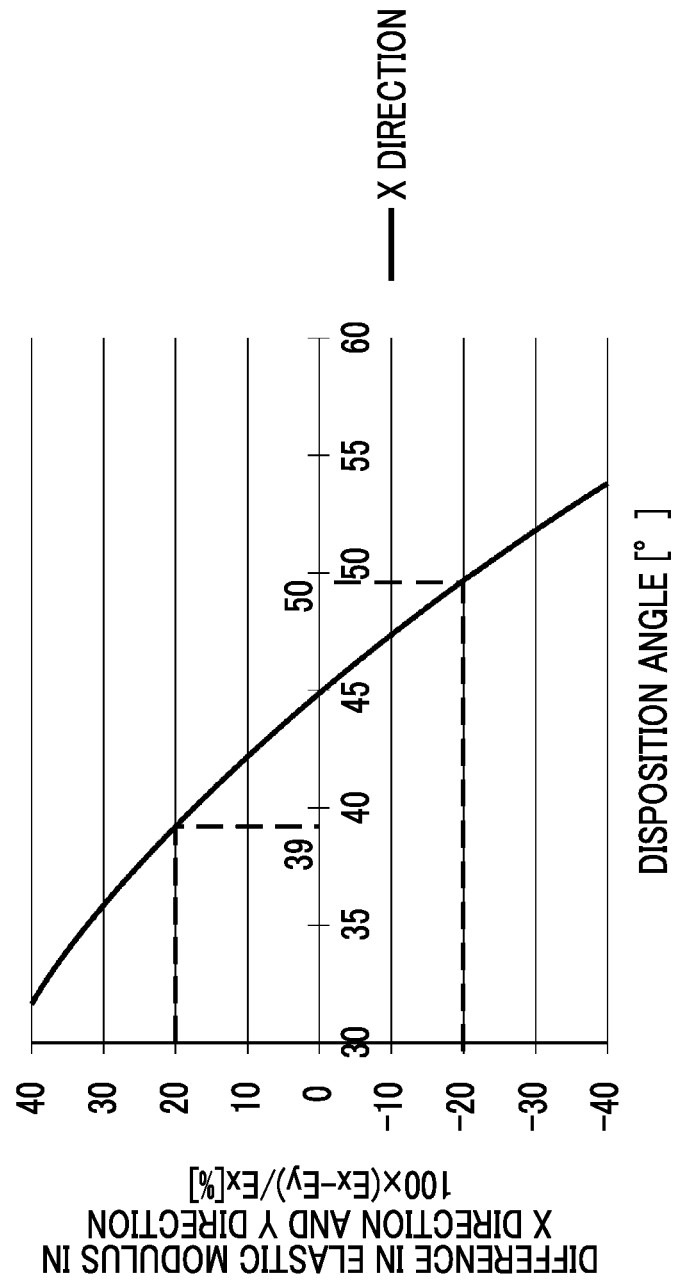
FIG. 5 is a graph showing a disposition angle of a reinforcing fiber in the bag surface-smoothing sheet and a difference in elastic modulus in an X direction and a Y direction of the bag surface-smoothing sheet.

The angle θ1 and the angle θ2 are preferably in a range of 40 degrees to 50 degrees. As shown in FIG. 5, in a case where the angle θ1 is in a range of 40 degrees to 50 degrees (the angle θ2 is in a range of 50 degrees to 40 degrees), the bag surface-smoothing sheet 4 has desired stretchability in both the X direction and the Y direction in FIG. 6. Thereby, as shown in FIG. 6, when the bent portion 42 is bent downward, a portion thereof being in contact with the corner 111 is appropriately stretched to prevent the bent portion 42 from coming into contact with the laminated body 110 with uneven strength, and thus the bent portion 42 can be bent uniformly.

In particular, in a case where each of the angle θ1 and the angle θ2 is 45 degrees, the bag surface-smoothing sheet 4 is stretched substantially evenly in the X direction and the Y direction, and therefore, it is possible to more easily bend the bent portion 42 without considering a difference in stretchability in the X direction and the Y direction.

Figure 6:
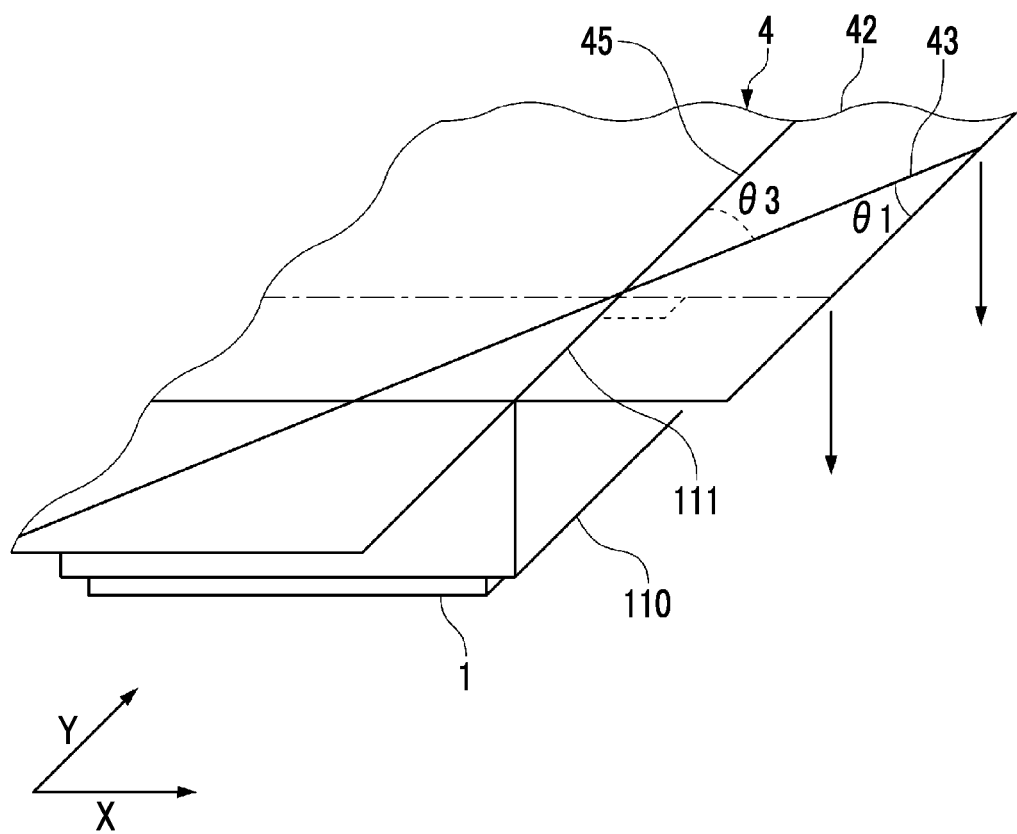
FIG. 6 is an enlarged view of a part of FIG. 2.

Further, the warp yarn 43 and the weft yarn 44 have the configurations described above, whereby the bag surface-smoothing sheet 4 is disposed such that the peripheral edge 45 substantially coincides with the corner 111, as shown in FIG. 6. Then, when the bent portion 42 is brought into contact with the side surface of the laminated body 110, high shape conformability is obtained.

Specifically, if the peripheral edge 45 is disposed so as to substantially coincide with the corner 111, the warp yarn 43 is disposed such that the angle θ3 between the warp yarn 43 and the corner 111 is an acute angle. For this reason, the angle between each of the warp yarn 43 and the weft yarn 44 and the peripheral edge 45 of the main body 41, the length of each of the warp yarn 43 and the weft yarn 44 extending from a place where the main body 41 and the upper surface of the laminated body 110 are in contact with each other, or the like is different from that in a case where the warp yarn 43 is disposed so as to be orthogonal to the peripheral edge 45 of the main body 41 (a dot-and-dash line in FIG. 6). For this reason, the bag surface-smoothing sheet 4 is easily stretched in the X direction and the Y direction, and the warp yarn 43 and the weft yarn 44 easily bend. Therefore, high shape conformability is obtained.

Figure 7A:
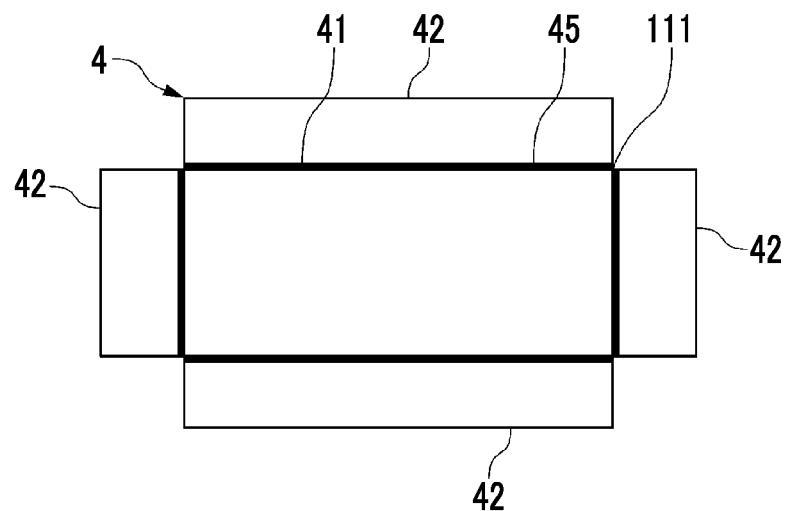

Due to the stretchability and the shape conformability described above, if the bag surface-smoothing sheet 4 is placed on the laminated body 110 with the peripheral edge 45 made to coincide with the corner 111 and the bent portion 42 is bent downward so as to come into contact with the side surface of the laminated body 110, the portion of the bag surface-smoothing sheet 4 corresponding to the corner 111 does not strongly hit against the corner 111. The contact strength of an area corresponding to the corner 111 when the bent portion 42 is bent according to this embodiment in this manner was measured. As a result, as shown in FIG. 7A, the bent portions corresponding to the corners 111 along the peripheral edges 45 hit against the corners 111 with substantially the same strength.

Figure 3B:
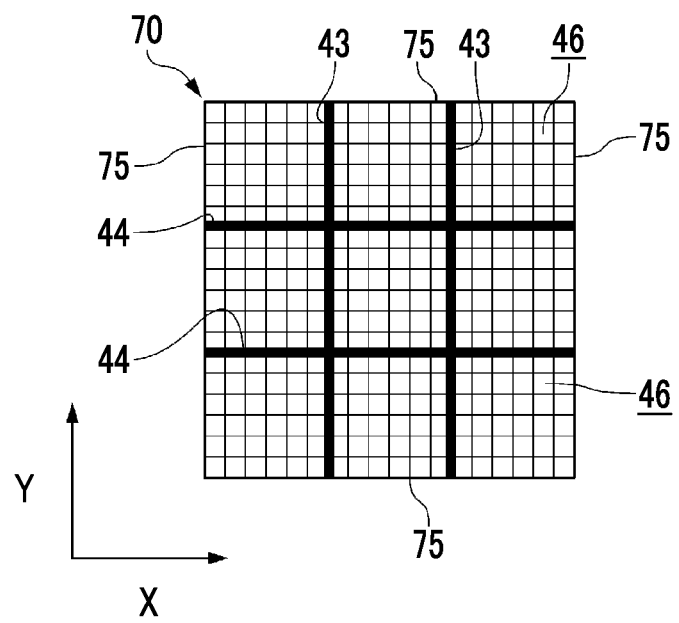
FIG. 3B is a plan view showing a bag surface-smoothing sheet in which warp yarns and weft yarns are orthogonal to sides.
Figure 7B:
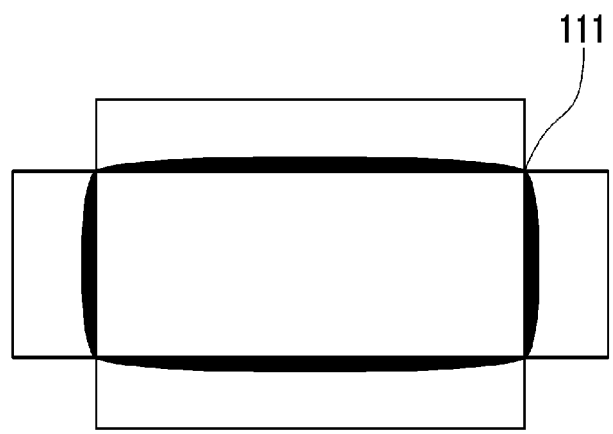

If a bag surface-smoothing sheet 70 in which the warp yarns 43 and the weft yarns 44 are orthogonal to peripheral edges 75, as shown in FIG. 3B, is placed on the composite material 100 such that the peripheral edge 75 is parallel to the corner 111 and is bent, a position where a contact is strong and a position where a contact is weak appear, as shown in FIG. 7B.

Figure 4:
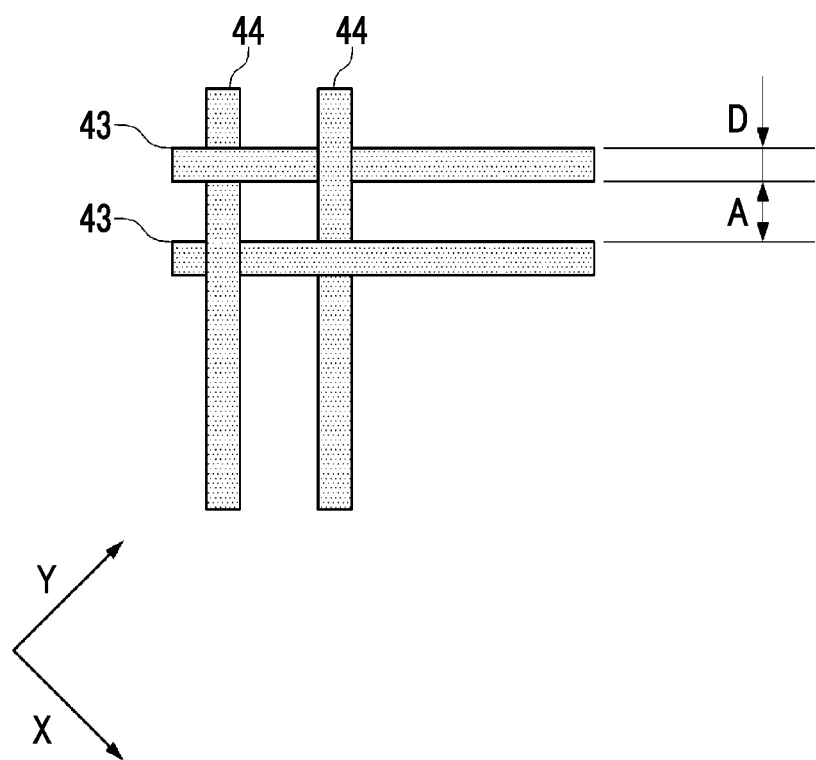
FIG. 4 is an enlarged view showing some of the warp yarns and the weft yarns in FIG. 3A.

The materials of the warp yarn 43 and the weft yarn 44 are not limited as long as they can impart desired rigidity to the bag surface-smoothing sheet 4. However, the warp yarn 43 and the weft yarn 44 can be made of any known fiber resin such as polyester resin, for example. The warp yarn 43 and the weft yarn 44 are alternately positioned one above and the other below, as shown in FIG. 4. That is, the warp yarns 43, 43 . . . and the weft yarns 44, 44 . . . as the rigidity imparting materials are formed by being woven with a plain weave. Then, a distance A between the warp yarns 43 adjacent to each other is about twice a thickness D. The same applies to the weft yarns 44.

The pass medium 5 which is placed on the bag surface-smoothing sheet 4 is made of a netlike sheet, similar to the bag surface-smoothing sheet 4. However, the pass medium 5 is provided to promote uniform infiltration of the resin composition C injected from the injection port 8 into the laminated body 110 (refer to FIG. 1B).

The pass medium 5 has the same planar shape as the bag surface-smoothing sheet 4, although illustration is omitted. However, the pass medium 5 does not have a rigidity imparting material. For this reason, the pass medium 5 has lower rigidity than the bag surface-smoothing sheet 4. The pass medium 5 aims to promote uniform infiltration of the resin composition C, and therefore, the pass medium 5 may have rigidity lower than that of the bag surface-smoothing sheet 4.

Similar to the bag surface-smoothing sheet 4, a plurality of meshes penetrating the front and back surfaces are formed in the pass medium 5. However, the opening size (mesh) of the mesh is larger and the porosity is higher than in the bag surface-smoothing sheet 4.

Here, in general, in the pass medium which is used in the VaRTM method, it can be said that the higher the porosity is, the higher the diffusivity of resin is. The resin composition C flowing through the mesh of the pass medium diffuses with the space between the pass medium 5 and the laminated body 110 as a flow path and is impregnated in the laminated body 110.

[Covering Step]

Thereafter, as shown in FIG. 1A, the reinforcing fiber substrate 2, the peel ply 3, the bag surface-smoothing sheet 4, and the pass medium 5 installed on the forming die 1, as described above, are covered with the bag film 6. A seal member 11 is provided between the peripheral edge of the bag film 6 and the upper surface of the forming die 1, whereby a sealed forming space S is formed between the bag film 6 and the forming die 1. The reinforcing fiber substrate 2, the peel ply 3, the bag surface-smoothing sheet 4, and the pass medium 5 are disposed in the forming space S. The bag film 6 is provided with a suction port 7 and the injection port 8, and as shown in FIG. 1B, the suction port 7 is connected to a vacuum pump 9 and the injection port 8 is connected to a storage tank 10 in which a liquid resin composition C is stored.

[Vacuum Suction Step]

After the forming space S is formed between the bag film 6 and the forming die 1, as shown in FIG. 1B, the vacuum pump 9 is driven to perform suction through the suction port 7 to reduce the pressure in the forming space S (evacuation). A forming load composed of a differential pressure between the pressure in the forming space S and the atmospheric pressure outside the bag film 6 acts on the reinforcing fiber substrate 2 disposed in the forming space S through the bag surface-smoothing sheet 4 and the pass medium 5.

Therefore, the bag surface-smoothing sheet 4 is pressed against the laminated body 110 through the peel ply 3. The bag surface-smoothing sheet 4 has high rigidity due to the rigidity imparting material. Therefore, in a resin impregnation step which will be described later, formation of irregularities on the surface of the composite material 100, which is caused by a free flow of the resin composition C, can be prevented.

[Resin Impregnation Step]

Then, if the reduction of the pressure in the forming space S is further continued, since the storage tank 10 is connected to the injection port 8, as shown in FIG. 1B, the liquid resin composition C in the storage tank 10 is injected into the forming space S under reduced pressure through the injection port 8. The resin composition C injected into the forming space S sequentially passes through the pass medium 5, the bag surface-smoothing sheet 4, and the peel ply 3 and is impregnated in the reinforcing fiber substrate 2.

The resin composition C may be, for example, thermosetting resin that is cured by heating, such as unsaturated polyester resin, epoxy resin, polyamide resin, or phenol resin, or may be thermoplastic resin that is typified by nylon, polyethylene, polystyrene, polyvinyl chloride, polybutylene terephthalate, or the like.

In this embodiment, the pass medium 5 having porosity higher than that of the bag surface-smoothing sheet 4 is disposed on the bag surface-smoothing sheet 4. For this reason, the impregnation amount of the resin composition C becomes substantially equal over the entire area of the surface of the pass medium 5. Thereby, even if the mesh 46 of the bag surface-smoothing sheet 4 has a smaller opening size than the mesh of the pass medium 5 and the diffusion efficiency in the bag surface-smoothing sheet 4 is lower than that in the pass medium 5, even diffusion of the resin composition C into the laminated body 110 can be secured.

In this manner, on the premise that it is possible to supply the resin composition C to the laminated body 110 even with only the bag surface-smoothing sheet 4, It is possible to prevent the formation of irregularities on the surface of the composite material 100 due to the use of the coarse mesh of the pass medium 5 for improvement in the diffusion rate of the resin composition C.

[Resin Curing Step]

After the reinforcing fiber substrate 2 is impregnated with a necessary amount of the resin composition C, the impregnated resin composition C is cured. Specifically, in a case where the resin composition C is thermosetting resin, it is cured by heating the forming space S. In order to heat the resin composition C, any heating device can be used. On the other hand, in a case where the resin composition C is thermoplastic resin, the molten resin is cooled and cured. Also in the curing step of the resin composition C, it is preferable to maintain the forming space S under reduced pressure.

[Removal Step]

After the resin composition C is cured, pressure reduction and heating (or cooling) are released. Then, after the connection between the suction port 7 and the vacuum pump 9 and the connection between the injection port 8 and the storage tank 10 are released, the peel ply 3 is peeled off from the cured composite material 100 to remove the bag surface-smoothing sheet 4, the pass medium 5, and the bag film 6. Thereafter, the formed composite material 100 is removed from the forming die 1.

With the above, a series of steps of forming the composite material 100 is finished.

Next, the composite material 100 which is manufactured by the method for manufacturing the composite material 100 according to this embodiment described above will be described.

The composite material 100 has the matrix resin 120 and the laminated body 110, as shown in FIG. 1C. In the laminated body 110, it is preferable that reinforcing fibers are included in a predetermined range in the matrix resin 120, as described below.

That is, if the amount of the reinforcing fibers which are included in the composite material 100 is small, the strength of the composite material 100 cannot be sufficiently secured, and conversely, if the amount of the reinforcing fibers which are included in the composite material 100 is large, the number of intersections of the warp yarns 43 and the weft yarns 44 increases, and thus there is a concern that voids may be generated during the [resin impregnation step]. The amount of the reinforcing fibers which are included in the composite material 100 can be appropriately set according to the use or the like of the composite material 100.

If the bag surface-smoothing sheet 4 of this embodiment is used, even in a corner R of the corner 111 which is described below, the amount of the reinforcing fibers in the corner 111 and the vicinity thereof can be determined to be in a desired range.

The shape of the composite material 100 is substantially a rectangular parallelepiped shape, similar to the laminated body 110 before it is impregnated with the resin composition C. The dimension of the corner 130 of the composite material 100 should be set according to the specification of the composite material 100. However, in the cross-sectional shape shown in FIG. 1C, the corner R can be set to 10.0 mm or less and can be set to 5.0 mm or less. Even in the corner 130 having the dimension in this range, the amount of the reinforcing fibers can be determined to be within a desired range.

Hereinafter, the effects that the method for manufacturing the composite material of this embodiment and the composite material exhibit will be described.

According to the present invention, when the bag surface-smoothing sheet 4 is disposed, the warp yarn 43 (the weft yarn 44) is disposed such that the angle θ3 with respect to the corner 111 of the laminated body 110 forms an acute angle, whereby, when the bent portion 42 is bent, the warp yarn 43 (the weft yarn 44) is subjected to shear deformation in the "placement step" described above. Therefore, the warp yarn 43 (the weft yarn 44) is easily conformed to the corner R. For this reason, as shown in FIG. 7, it is possible to make the content rate (VF) of the reinforcing fibers after FRP forming in the vicinity of the corner 130 of the composite material 100 uniform, compared to the related art. Further, in the "vacuum suction step" described above, since the bag surface-smoothing sheet 4 has necessary rigidity, it is possible to prevent formation of irregularities on the surface of the composite material 100, which is generated by a free flow of the resin composition C. As a result, the surface of the composite material 100 can have a predetermined surface roughness.

Further, as shown in FIG. 3A, the warp yarns 43 are disposed such that the angle θ1 between each of the warp yarns 43 and the peripheral edge 45 of the bag surface-smoothing sheet 4 is an acute angle, whereby it is possible to dispose the warp yarn 43 such that the angle θ3 between the warp yarn 43 and the corner 111 becomes an acute angle, when the bag surface-smoothing sheet 4 is placed on the laminated body 110, similar to the related art.

Further, in the manufacturing method of the related art, the bag surface-smoothing sheet 4 is merely added as a member which is used, and therefore, the present invention can be easily implemented.

Furthermore, due to using the bag surface-smoothing sheet 4, it is possible to improve work efficiency, because there is no need for a step of cutting the bag surface-smoothing sheet 4 before use, as in a case where the bag surface-smoothing sheet 70 in which the warp yarns 43 are orthogonal to the peripheral edge 45, as shown in FIG. 3B, is disposed in a state where it has been rotated in the circumferential direction such that the angle θ3 which is an acute angle is formed.

Further, even if the formed composite material 100 has the corner 130, it is possible to make the VF in the vicinity of the corner 130 a desired value, and even if the corner 130 has R of 5.0 mm or less in the cross-sectional shape, the VF in the vicinity of the corner 130 can be made to be a desired value. Further, these composite materials 100 can be obtained with good yield.

The preferred embodiment of the present invention has been described above. However, it is possible to select the configurations described in the embodiment or appropriately change the configurations to other configurations without departing from the gist of the present invention.

The method for manufacturing the composite material 100 according to this embodiment has been described by taking the VaRTM method as an example. However, there is no limitation thereto, and the present invention is applied to a general resin forming method in which resin is injected into a forming space while reducing the pressure in the forming space in which a reinforcing fiber substrate is disposed. For example, the present invention can also be applied to, for example, forming methods other than the VaRTM method, such as a resin impregnation forming method (RTM: Resin Transfer Molding) or a reduced pressure type resin impregnation forming method (Light-RTM).

Further, in the present invention, as shown in FIG. 3B, the bag surface-smoothing sheet 70 may be used. In this case, the position at which the bag surface-smoothing sheet 70 is placed on the laminated body 110 is adjusted such that the warp yarns 43 and the weft yarns 44 of the bag surface-smoothing sheet 70 form acute angles θ3 with the corners 111 of the laminated body 110.

Further, in this embodiment, the warp yarns 43 and weft yarns 44 as the rigidity imparting materials are provided on the bag surface-smoothing sheet 4. However, the present invention is not limited thereto. Warp yarns and weft yarns themselves configuring the bag surface-smoothing sheet 4 can be made of highly rigid materials such as polyester or nylon, and the rigidity can also be imparted by setting the diameters of the yarns.

The same applies to the pass medium 5, and it is possible to provide rigidity imparting materials such as the warp yarn 43 and the weft yarn 44 to the pass medium 5. Warp yarns and weft yarns themselves configuring the pass medium 5 can be made of highly rigid materials such as polyester or nylon, and the rigidity can also be imparted by setting the diameters of the yarns. Thereby, in the [vacuum suction step], it is possible to more reliably prevent formation of irregularities on the surface of the composite material 100, which is caused by a free flow of the resin composition C.

Further, in the manufacturing method of this embodiment, two netlike sheets, namely, the bag surface-smoothing sheet 4 and the pass medium 5, are used. However, the present invention permits the use of only one netlike sheet. Thereby, the number of members which are used in the manufacturing method can be reduced.

In the bag surface-smoothing sheet 4 and the pass medium 5, meshes are provided to form voids into which the resin composition C flows. However, the materials of the bag surface-smoothing sheet 4 and the pass medium 5 can be changed according to the composite material 100 to be manufactured. Thereby, the surface texture of the composite material 100 can be improved, or the work efficiency can be improved.

The shape of the composite material 100 can be appropriately selected from not only a rectangular parallelepiped shape but also various shapes according to the use thereof. In that case, it is necessary to prepare the laminated body 110 which is substantially equal to the selected shape.

REFERENCE SIGNS LIST

1: forming die
2: reinforcing fiber substrate
3: peel ply
4: bag surface-smoothing sheet
41: main body
42: bent portion
43: warp yarn
44: weft yarn
45: peripheral edge
46: mesh
5: pass medium
6: bag film
7: suction port
8: injection port
9: vacuum pump
10: storage tank
70: bag surface-smoothing sheet
75: peripheral edge
100: composite material
110: laminated body 111: corner
120: matrix resin
130: corner
A: distance
D: thickness
S: forming space
C: resin composition

The invention claimed is:

1. A method for manufacturing a composite material comprising:
 a placement step of placing
  a netlike sheet including a plurality of warp yarns and a plurality of weft yarns as strength imparting materials, through which a resin composition permeates, on a reinforcing fiber substrate disposed on a forming die, the plurality of warp yarns being made of a polyester resin and the plurality of weft yarns being made of a polyester resin, and
  a sheet-shaped pass medium, through which the resin composition permeates, on the netlike sheet;
 a covering step of covering the reinforcing fiber substrate, the netlike sheet, and the sheet-shaped pass medium disposed on the forming die with a bag film to form a sealed forming space between the bag film and the forming die;
 an injection/impregnation step of injecting the resin composition into the forming space to impregnate the reinforcing fiber substrate with the resin composition passing through a mesh of the netlike sheet and the sheet-shaped pass medium;
 a resin curing step of curing the resin composition impregnated in the reinforcing fiber substrate; and
 after the resin curing step of curing the resin composition impregnated in the reinforcing fiber substrate, a step of removing the sheet-shaped pass medium, the netlike sheet, and the bag film from the reinforcing fiber substrate,
 wherein
 the netlike sheet is configured from a plain weave of the plurality of warp yarns and the plurality of weft yarns,
 in the netlike sheet, the plurality of warp yarns and the plurality of weft yarns are disposed in a lattice pattern,
 in the placement step, after the netlike sheet is placed on the reinforcing fiber substrate such that the plurality of warp yarns and the plurality of weft yarns form acute angles with respect to edges of the reinforcing fiber substrate, the netlike sheet protruding from the reinforcing fiber substrate is bent,
 the forming die has a flat surface to place the reinforcing fiber substrate, and
 the forming die has a shape of rectangular parallelepiped.

2. The method for manufacturing a composite material according to claim 1, wherein the acute angles are in a range of 40 degrees to 50 degrees.

3. The method for manufacturing a composite material according to claim 1, wherein the netlike sheet has a quadrangle when viewed in a plan view, and the plurality of warp yarns and the plurality of weft yarns form acute angles with respect to at least one of peripheral edges defining the quadrangle, and
 in the placement step, after the netlike sheet is placed on the reinforcing fiber substrate such that the at least one of peripheral edges of the netlike sheet and the edges of the reinforcing fiber substrate are parallel to each other, the netlike sheet protruding from the reinforcing fiber substrate is bent.

4. The method for manufacturing a composite material according to claim 2, wherein the netlike sheet has a quadrangle when viewed in a plan view, and the plurality of warp yarns and the plurality of weft yarns form acute angles with respect to at least one of peripheral edges defining the quadrangle, and
 in the placement step, after the netlike sheet is placed on the reinforcing fiber substrate such that the at least one of peripheral edges of the netlike sheet and the edges of the reinforcing fiber substrate are parallel to each other, the netlike sheet protruding from the reinforcing fiber substrate is bent.

5. The method for manufacturing a composite material according to claim 1, wherein the netlike sheet has a quadrangle when viewed in a plan view, and the plurality of warp yarns and the plurality of weft yarns are orthogonal to at least one of peripheral edges defining the quadrangle, and
 in the placement step, after the netlike sheet is placed on the reinforcing fiber substrate such that the at least one of peripheral edges of the netlike sheet form acute angles with respect to the edges of the reinforcing fiber substrate, the netlike sheet protruding from the reinforcing fiber substrate is bent.

6. The method for manufacturing a composite material according to claim 2, wherein the netlike sheet has a quadrangle when viewed in a plan view, and the plurality of warp yarns and the plurality of weft yarns are orthogonal to at least one of peripheral edges defining the quadrangle, and
 in the placement step, after the netlike sheet is placed on the reinforcing fiber substrate such that the at least one of peripheral edges of the netlike sheet form acute angles with respect to the edges of the reinforcing fiber substrate, the netlike sheet protruding from the reinforcing fiber substrate is bent.

7. The method for manufacturing a composite material according to claim 1, further comprising:
 a vacuum suction step of evacuating the forming space after the covering step,
 wherein the injection/impregnation step is performed in the evacuated forming space.

8. The method for manufacturing a composite material according to claim 2, further comprising:
 a vacuum suction step of evacuating the forming space after the covering step,
 wherein the injection/impregnation step is performed in the evacuated forming space.

9. The method for manufacturing a composite material according to claim 3, further comprising:
 a vacuum suction step of evacuating the forming space after the covering step,
 wherein the injection/impregnation step is performed in the evacuated forming space.

10. The method for manufacturing a composite material according to claim 4, further comprising:
 a vacuum suction step of evacuating the forming space after the covering step,
 wherein the injection/impregnation step is performed in the evacuated forming space.

11. The method for manufacturing a composite material according to claim 5, further comprising:
 a vacuum suction step of evacuating the forming space after the covering step,
 wherein the injection/impregnation step is performed in the evacuated forming space.

12. The method for manufacturing a composite material according to claim 6, further comprising:

a vacuum suction step of evacuating the forming space after the covering step,
wherein the injection/impregnation step is performed in the evacuated forming space.

* * * * *